(12) United States Patent
Ambrose

(10) Patent No.: US 8,584,707 B2
(45) Date of Patent: Nov. 19, 2013

(54) DOSING MANIFOLD ASSEMBLY

(75) Inventor: Steven L. Ambrose, Farmington Hills, MI (US)

(73) Assignee: International Engine Intellectual Property Company, LLC, Lisle, IL (US)

(*) Notice: Subject to any disclaimer, the term of this patent is extended or adjusted under 35 U.S.C. 154(b) by 379 days.

(21) Appl. No.: 12/958,735

(22) Filed: Dec. 2, 2010

(65) Prior Publication Data

US 2011/0067773 A1 Mar. 24, 2011

Related U.S. Application Data

(63) Continuation-in-part of application No. 12/428,004, filed on Apr. 22, 2009, now abandoned.

(51) Int. Cl.
*F16K 11/00* (2006.01)
*F16K 31/02* (2006.01)

(52) U.S. Cl.
USPC ....... 137/861; 137/884; 137/550; 251/129.15

(58) Field of Classification Search
USPC ............. 137/884, 861, 549, 550; 251/129.15
See application file for complete search history.

(56) References Cited

U.S. PATENT DOCUMENTS

| | | | |
|---|---|---|---|
| 4,532,951 A * | 8/1985 | Fermanich | 251/129.15 |
| 4,621,593 A | 11/1986 | Rao et al. | |
| 5,375,623 A | 12/1994 | Weber | |
| 5,465,937 A * | 11/1995 | Nokubo et al. | 251/129.15 |
| 5,975,654 A | 11/1999 | Zaviska et al. | |
| 6,068,672 A | 5/2000 | Watson et al. | |
| 6,276,764 B1 | 8/2001 | Park | |
| 6,758,175 B2 * | 7/2004 | Dinkel et al. | 123/90.12 |
| 7,036,525 B2 * | 5/2006 | Ichinose et al. | 251/129.15 |
| 7,270,046 B2 * | 9/2007 | Stephenson et al. | 137/596.16 |
| 7,469,531 B2 | 12/2008 | Viola | |
| 7,523,722 B2 | 4/2009 | Valentine et al. | |
| 7,721,533 B2 | 5/2010 | Imoehl et al. | |
| 8,006,719 B2 * | 8/2011 | Nordstrom et al. | 251/129.15 |
| 2005/0284524 A1 | 12/2005 | Uryu et al. | |
| 2007/0033927 A1 | 2/2007 | Homby et al. | |
| 2007/0277508 A1 | 12/2007 | Hendrickson | |
| 2008/0022668 A1 | 1/2008 | Bugos et al. | |
| 2009/0114864 A1 | 5/2009 | Scheffer | |
| 2010/0082224 A1 | 4/2010 | Stretch | |
| 2010/0089127 A1 | 4/2010 | Farnsworth | |

FOREIGN PATENT DOCUMENTS

EP 0762025 B1 9/2002

* cited by examiner

*Primary Examiner* — Kevin Lee
(74) *Attorney, Agent, or Firm* — Paul V. Keller

(57) ABSTRACT

A manifold assembly configured for distributing fluid to an externally connected hydraulic component which may be capable of leakage detection through measurement of pressure decay. The manifold assembly may include a manifold body and a valve assembly. The manifold body may have a plurality of fluid passages. Fluid flow may be controlled by the valve assembly attached to the manifold body. The valve assembly may include two valve devices capable of controlling fluid flow. When fluid is blocked by the valve devices, any fluid leakage may be unloaded from the valve assembly through an orifice located between the two valve devices. The orifice may provide a pressure unloading feature which may increase accuracy of measuring the pressure decay during leakage detection.

11 Claims, 11 Drawing Sheets

FIG.6 (OPEN)

FIG. 7 (CLOSED)

(OPEN)

(CLOSED)

US 8,584,707 B2

DOSING MANIFOLD ASSEMBLY

CROSS REFERENCE TO RELATED APPLICATION

This application is a continuation-in-part of U.S. Non-Provisional patent application Ser. No. 12/428,004 filed Apr. 22, 2009, now abandoned, hereby incorporated by reference in its entirety.

TECHNICAL FIELD

The invention relates generally to a fluid distribution manifold assembly, including a dosing manifold assembly for distributing diesel fuel to and from an after-treatment dosing injector and a fuel injector. The dosing manifold assembly may be utilized to detect internal and external leakage of a dosing manifold system including the dosing manifold assembly.

BACKGROUND

Exhaust gas after treatment systems are commonly used in conjunction with diesel engines for reducing the amount of nitrous oxides (NOx) in an exhaust gas. A typical configuration of the system has a reservoir filled with the treatment fluid, such as ammonia, fuel or urea, which is transported to a dosing injector, including, but not limited to a pump. The dosing injector sprays the treatment fluid into the exhaust gas prior to transport into a catalytic converter. The nitrous oxides in the exhaust gas are reduced when they react with the treatment fluid and are converted into water and nitrogen. After reacting in the catalytic converter, the exhaust gas is released from the catalytic converter into the atmosphere.

The use of diesel engines can range from small vehicles to large tractor-trailer truck applications. Due to the large variety of vehicles, the dosing requirements will vary due to different fuel pressures, flow rates, and required accuracy of the system. It is desirable to have a system for distributing the treatment fluid between the reservoir and injector which can easily accommodate various combinations of pressure relief, regulator, and on/off valves to provide scalability for the different dosing applications.

Additionally, the transfer of fluid poses the potential for leakage, both internally and externally. When a pump is used to move the treatment fluid, it can create significant pressure against system components, such as closed valves. As a result, these closed valves may leak, allowing fluid to pass. Such internal leakage can produce undesirable parasitic losses and can compromise leak detection accuracy. External leakage may pose safety concerns, harm the environment, and can damage system components. Thus, it is also desirable that the dosing manifold assembly be able to detect both internal and external system leaks.

SUMMARY

In an embodiment, a dosing manifold assembly comprises a manifold body and a first valve assembly. The manifold body has a supply passage configured to receive fluid from a pump fed by a tank; an output passage configured to send fluid to a hydraulic component, such as, but not limited to, a dosing injector; and a return passage configured to send fluid to the tank. The first valve assembly is connected to the manifold body and is configured to control fluid flow between the supply passage and output passage or return passage located in the manifold body.

In embodiments, the first valve assembly is comprised of a valve body including: a supply port in fluid communication with the supply passage, a first chamber, a second chamber in fluid communication with the first chamber, a first valve seat, and a control port in fluid communication with the output passage. The first valve assembly is further comprised of an armature positioned at least partially in the first chamber. The armature is configured to seal against the first valve seat when the first valve assembly is closed. The armature is configured to move away from the first valve seat to allow fluid to pass to the control port when the first valve assembly is open. The first valve assembly is further comprised of a valve device positioned in the second chamber which has a moveable portion positioned adjacent to the supply port to selectively admit fluid into the second chamber and past the first valve seat when the first valve assembly is open. The valve body has at least one orifice between the supply port and the first valve seat. The orifice is in fluid communication with the return passage and provides a pressure unloading function for venting fluid that leaks past the valve device when the valve assembly is closed, thereby substantially reducing any leakage into the output passage.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION

Figure 1:
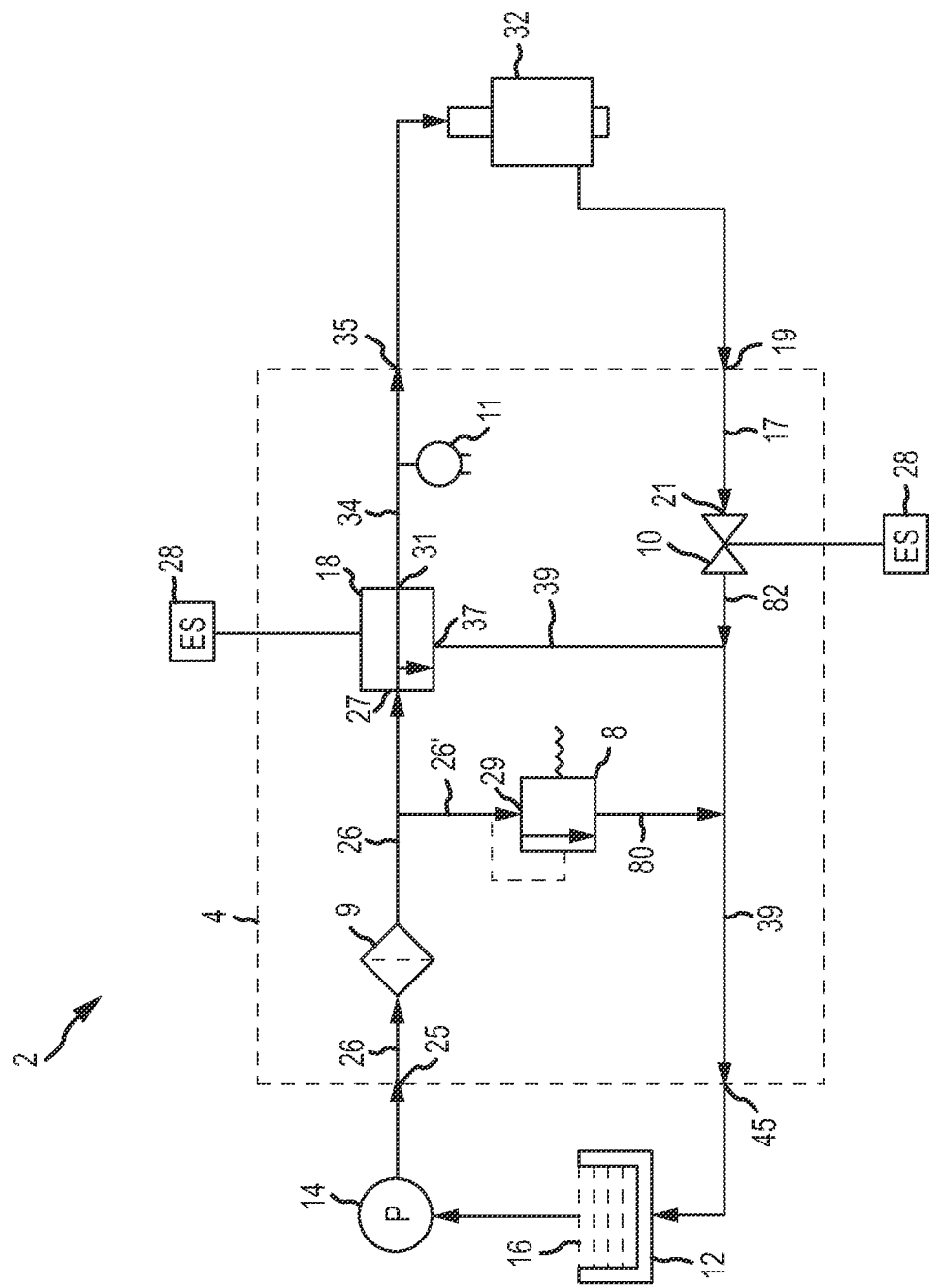
FIG. 1 is a schematic view of a fluid circuit of a dosing system that includes a dosing manifold assembly connected to a tank, a pump, and a hydraulic component in accordance with an embodiment of the invention.

Referring to FIG. 1, a fluid circuit for a dosing system may include a dosing manifold assembly 2 configured with an externally connected low-pressure tank, reservoir, or fluid sump 12, a pump 14, and a hydraulic component 32, such as but not limited to hydraulic machinery, valves, pistons, accumulators, or other fluid circuit devices. In an embodiment of the invention, the hydraulic component 32 may comprise an aftertreatment dosing injection. Although an aftertreatment dosing injector is mentioned in detail, other hydraulic components may be used as known to those of skill in the art.

The pump 14 may receive fluid 16 from the tank 12 and may supply a pressurized flow of fluid 16 to the dosing manifold assembly 2. The pump 14 may be an electric or mechanical pump and may include some form of pressure regulation within itself to divert excess flow back to the tank 12. Some examples of the pump 14 may include an electric pump with a mechanical pressure relief valve, an electric or mechanical pump with a mechanical pressure control, and a mechanical pump without manifold pressure control. While various examples of pumps 14 have been mentioned in detail, other types of pumps 14 may be used as know by those of skill in the art. The dosing manifold assembly 2 may supply the fluid 16 to the hydraulic component 32. The fluid 16 may be ejected outside of the fluid circuit by the externally connected hydraulic component 32. The fluid 16 not ejected outside of the fluid circuit may be returned to dosing manifold assembly 2. The dosing manifold assembly 2 may return the fluid 16 to the tank 12.

In an embodiment, the dosing manifold assembly 2 may include a manifold body 4 and a first valve assembly 18. In accordance with embodiments of the invention, the dosing manifold assembly 2 may include any combination of additional components, such as a second valve assembly 10, a filter 9, a pressure relief valve 8, and/or a sensor 11 depending upon the end-user's system requirements.

Referring to FIGS. 2-7, the manifold body 4 of the dosing manifold assembly 2 may comprise a plurality of cavities and a plurality of passages. At least some of the plurality of cavities may be formed in an outer surface of the manifold body 4, for example, employing industry standards known in the art to accommodate various standard port fittings and valves. Each of the plurality of passages may be formed to fluidly connect various components that may be connected to the manifold body 4. In an embodiment of the invention, the manifold body 4 may include a supply passage 26, an output passage 34, and a return passage 39. In accordance with embodiments of the invention, the manifold body 4 may also include a detection passage 17. Although the supply passage 26, the output passage 34, the return passage 39, and the detection passage 17 are mentioned, other passages may be used as known to those of skill in the art.

The supply passage 26 may have an inlet end 25 and a valve end 27. The inlet end 25 may be configured for receiving a standard-type hydraulic fitting and may be configured to receive fluid 16 from the externally attached pump 14. The valve end 27 may be configured for receiving the first valve assembly 18. Fluid 16 may flow from the inlet end 25 to the valve end 27. In an embodiment where the dosing manifold assembly 2 includes a pressure relief valve 8, the supply passage 26 may have two branches for the fluid flow: a first branch to the valve end 27 and a second branch 26' to a pressure relief end 29. The first branch for the valve end 27 may be configured to connect with/to the first valve assembly 18. The second branch for the pressure relief end 29 may be configured to connect with/to the pressure relief valve 8. Fluid 16 may flow from the inlet end 25 to the pressure relief end 29 and the valve end 27.

The output passage 34 may have a valve end 31 and an outlet end 35. The valve end 31 may be configured for receiving fluid 16 from the first valve assembly 18 when the first valve assembly 18 has been actuated to allow fluid 16 to flow from the supply passage 26 to the output passage 34 as described in more detail below. The outlet end 35 may be configured for receiving a standard-type hydraulic fitting and may be configured to send fluid 16 to an externally attached hydraulic component 32. The fluid 16 may flow from the valve end 31 to the outlet end 35.

The return passage 39 may have a valve end 37 and a port end 45. The valve end 37 may be configured for receiving fluid 16 from the first valve assembly 18. The port end 45 may include a first port opening 5 which may be configured for receiving a standard hydraulic fitting. Fluid 16 may flow from the valve end 37 to the first port opening 5. In an embodiment where the dosing manifold assembly 2 includes the pressure relief valve 8, the return passage 26 may have an additional branch 80 to accommodate fluid flow from the pressure relief valve 8. Additionally, in an embodiment where the dosing manifold assembly 2 includes the second valve assembly 10 (e.g., FIG. 3.), the return passage 26 may have an additional branch 82 to accommodate fluid 16 flow from the second valve assembly 10. The port end 45 may include a second port opening 6 which may be configured for receiving a standard-type hydraulic fitting. The second port opening 6 may be useful in those embodiments of the invention including the pressure relief valve 8 and/or the second valve assembly 10. Fluid 16 may thus exit the manifold body 4 from either the first port opening 5 and/or second port opening 6. Depending on an application's requirements, such as design package orientation, either the first port opening 5, second port opening 6, or both first and second port openings 5, 6 may be sealed with a service plug 13.

In an embodiment where the second valve assembly 10 is included as part of the dosing manifold assembly 2, the manifold body 4 may have a detection passage 17. The detection passage 17 may have an inlet end 19 and a valve end 21. The inlet end 19 may be configured for receiving a standard-type hydraulic fitting. The valve end 21 may be configured for receiving the second valve assembly 10. Fluid 16 may flow from the inlet end 19 to the valve end 21. When the second valve assembly 10 is in the open position, fluid 16 may flow from the detection passage 17 into the return passage 26.

The manifold body 4 may be comprised of various materials. The material or materials employed may depend on the system requirements, such as but not limited to, the type of fluid 16 distributed in the system, leakage tolerance, and surrounding system environment factors. In an embodiment of the invention, the manifold body 4 may, for example, comprise T6061 anodized aluminum which may provide anti-corrosive properties. Although T6061 anodized aluminum is mentioned specifically, the manifold body 4 may comprise any number of the materials known to those of skill in the art in various embodiments of the invention.

The shape of the manifold body 4 and the location of the mounting holes may be dependent upon the application requirements. In an embodiment of the invention, the manifold body 4 may be rectangular in shape and may provide a plurality of mounting holes. The manifold body 4 may, for example, include four mounting holes. Each of the mounting holes may be located near the corners of the manifold body 4. Although four mounting holes located near the corners of the manifold body 4 are mentioned, the manifold body 4 may comprise any number of mounting holes and these mounting holes may be located in various portions of the manifold body 4, including those anticipated by those of skill in the art.

Referring to FIGS. 1-3 and FIGS. 5-7, the first valve assembly may be connected to the manifold body 4. In an embodiment of the invention, the first valve assembly 18 may be secured to the manifold body 4 with a plurality of spring pins 7. The use of spring pins 7 may provide a cost-effective attachment method and may provide positional alignment between the first valve assembly 18 and the manifold body 4 during assembly. Although the use of spring pins 7 to attach the first valve assembly 18 to the manifold body 4 has been specifically mentioned, other attachment methods may be used, including those known to persons of ordinary skill in the art.

The first valve assembly 18 may be electrically connected to an energy source 28, labeled ES in FIG. 1. The energy source 28 (or ES) may, for example, comprise a battery, a capacitor, or other suitable electrical or electro-chemical storage device, or an electrical outlet, via a wireless or hard-wired electrical connection 30. If the second valve assembly 10 comprises an electrohydraulic on/off valve, it may likewise be electrically connected to an energy source 28.

Control logic may be implemented to selectively open and close the first valve assembly 18 as needed or desired to control the flow of the fluid 16. The fluid 16 from the supply passage 26 may be admitted into the first valve assembly 18 through a supply port 20. When the first valve assembly 18 is turned on, which in a normally-closed device may occur when the first valve assembly 18 is selectively energized, the fluid 16 from the supply passage 26 admitted into the first valve assembly 18 may ultimately be discharged from the first valve assembly 18 via a control port 22 to the output passage 34 of the manifold body 4. At least one orifice 23 may be in fluid communication with the tank 12 via the return passage 26 to provide a pressure unloading feature as set forth below with reference to FIGS. 5 and 7. While a single orifice 23 is shown in the various figures for simplicity, additional orifices 23 can also be used. The number of orifices 23 used may be determined by the amount of available valve stroke, orifice size, and leakage past a lower valve 24 in the open and closed positions as explained below.

Figure 6:
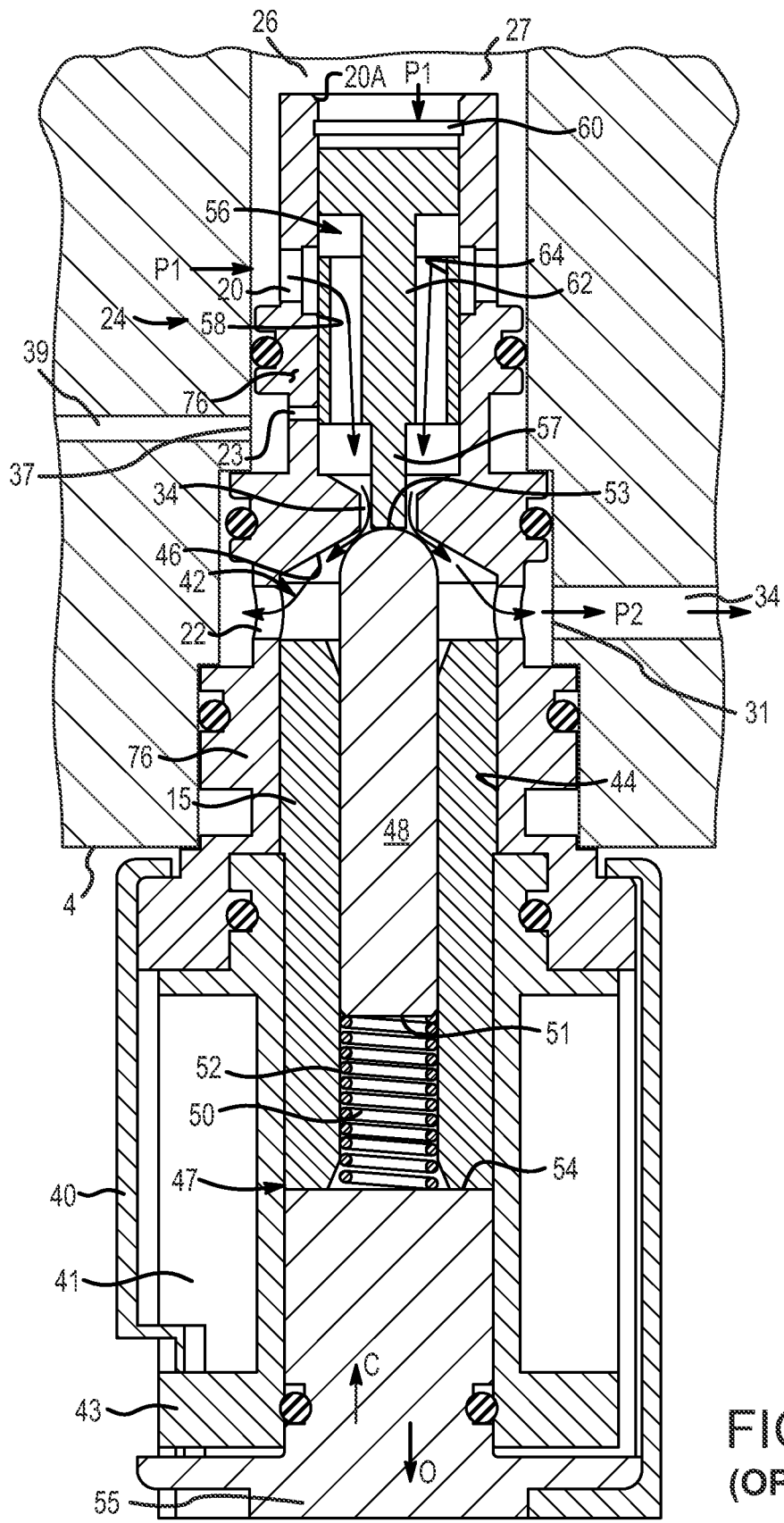
FIG. 6 is a schematic cross-sectional illustration of the first valve assembly in an opened position and partial view of the surrounding dosing manifold assembly within the fluid circuit of FIG. 1 in accordance with an embodiment of the invention.
Figure 7:
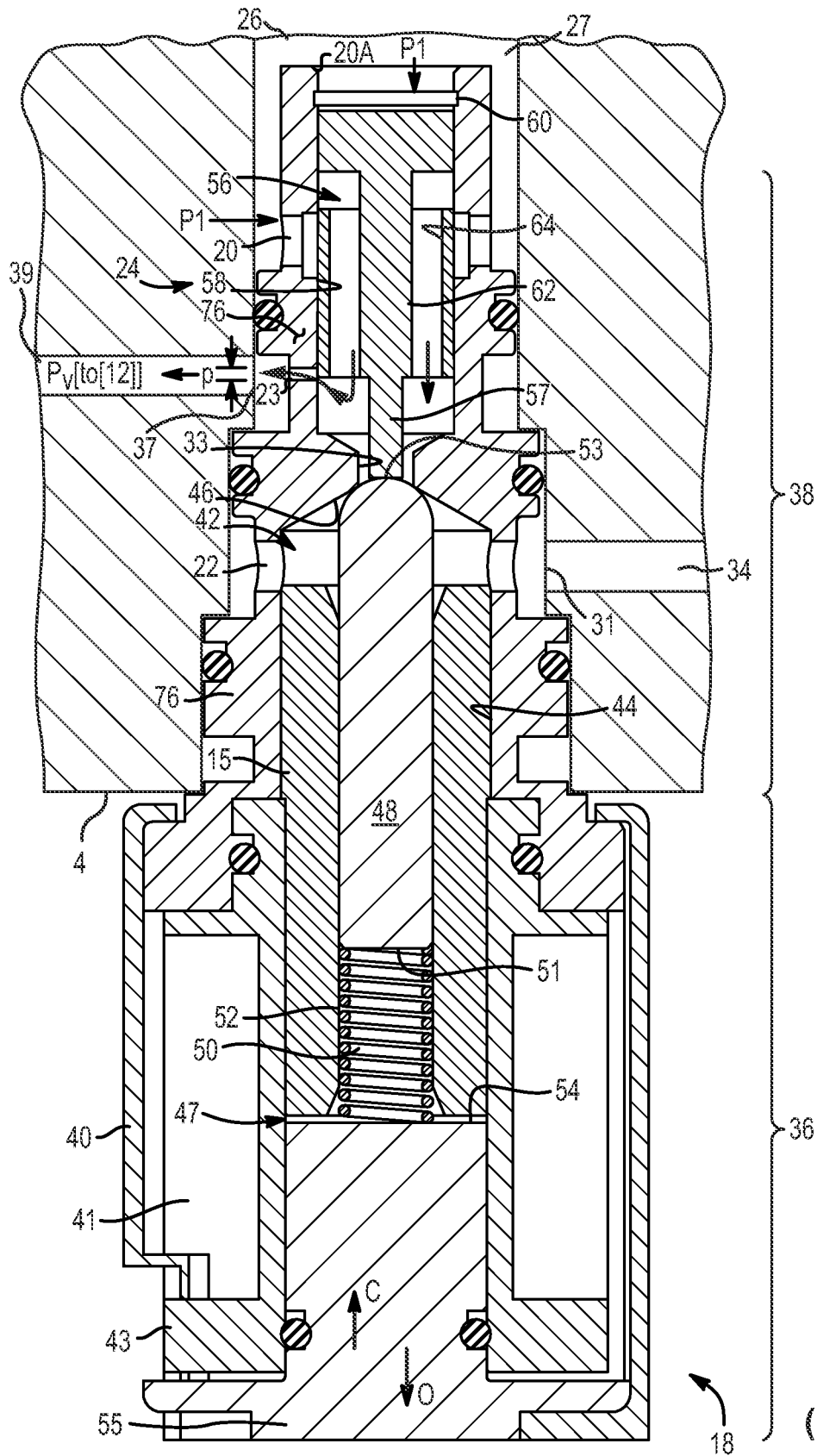
FIG. 7 is a schematic cross-sectional illustration of the first valve assembly of FIG. 6 in a closed position.

Referring to FIG. 7, the first valve assembly 18 is shown in a closed position, blocking passage of a pressure (P1) to the control port 22. The first valve assembly 18 may include a solenoid portion 36 and a valve body 38. The solenoid portion 36 may be electrically connected to an energy source 28, such as shown in FIG. 1. In this embodiment, when the solenoid portion 36 is de-energized in a normally-closed configuration, fluid 16 may be blocked from reaching the control port 22. That is, fluid 16 may be prevented from being discharged from the valve body 38 via the control port 22, which may be disposed in a wall 76 thereof. In this manner, the control pressure (P2) (see e.g., FIG. 6) at the control port 22 may prevent fluid flow to the output passage 34 and may therefore not be made available for use by the externally connected hydraulic components 32 shown in FIG. 1.

The first valve assembly 18 may be configured as an electro-hydraulic device, and may include a solenoid housing 40 that includes a solenoid winding or coil 41. The coil 41 may, for example, be wound on a bobbin 43, and may be selectively energized to actuate or power the first valve assembly 18. That is, when the coil 41 is de-energized, the first valve assembly 18 may restrict fluid communication between the supply port 20 and the control port 22. When the coil 41 is energized, a magnetic field may be induced, thus generating magnetic flux which may ultimately open the first valve assembly 18 to allow flow from the supply passage 26 to the output passage 34. Fluid 16 may pass through the supply port 20 and exit the first valve assembly 18 through the control port 22 as shown in FIG. 6 and described below.

In addition to the control port 22, the valve body 38 may include an inner wall 44 defining an upper chamber 42 that may define an upper valve seat 46. An armature 48 may move axially within the upper chamber 42 in the direction of arrow C absent a magnetic field as described above. A resilient member 50, such as a spring or other suitable return device, may be positioned between a first end 51 of the armature 48 and an undersurface 54 of a pole portion 55 to react against the undersurface 54, and to thereby provide a sufficient return force for moving the armature 48 in the direction of arrow C when the solenoid portion 36 is de-energized as shown in FIGS. 6-7.

The armature 48 may be disposed in a magnetic sleeve 15 to move in conjunction therewith. In one embodiment, the magnetic sleeve 15 may circumscribe the armature 48. The sleeve 15 may be moveably disposed within the upper chamber 42 of the valve body 38 and may define an air gap 47 with the undersurface 54 of the pole portion 55. A second end 53 of the armature 48 may be configured to seal against the upper valve seat 46 with a predetermined maximum rate of fluid bypass. The armature 48 may extend axially toward a lower chamber 56 of the valve body 38 and may contact a lower valve 24 through a connecting port 33, with the connecting port 33 providing fluid communication between the upper and lower chambers 42 and 56, respectively.

Still referring to FIG. 6, the volume of the lower chamber 56 may be defined by an inner wall 58, which may contain or house the lower valve 24. As shown in the embodiment of FIGS. 6 and 7, the lower valve 24 may be configured as a spool valve. However, other embodiments are possible without departing from the intended scope of the invention, including but not limited to the ball poppet of FIGS. 8 and 9 described below.

The valve body 38 may also define the supply force balance port 20A, within which is disposed a stop device 60, e.g., an annular snap ring or other suitable spool-retaining device. When the energy source 28 of FIG. 1 energizes the coil 41, the sleeve 15 may be magnetically attracted toward the pole portion 55, and thus the armature 48 may move axially in the direction of arrow O within the upper chamber 42. As a result, the force of the resilient member 50 may be overcome and the resilient member 50 may compress against the undersurface 54 (see e.g., FIG. 6). As the armature 48 moves in the direction of arrow O, the lower valve 24 may also be free to move in the direction of arrow O in response to fluid pressure at the supply force balance port 20A.

When the lower valve 24 is configured as a spool valve as shown in the embodiment of FIGS. 6 and 7, the lower valve may include a spool 62 defining axial fluid passages 64 therein. The spool 62 may include an extension 57 which may contact the armature 48, such that motion of the armature 48 may move the spool 62. When the first valve assembly 18 is in an open position as described below, the fluid 16 providing pressure (P1) at the supply port 20, 20A may flow through the axial fluid passages 64, through the connecting port 33, and into the upper chamber 42, where it may ultimately be discharged through the control port 22 to provide the control pressure P2. Thus, fluid flow may be provided with minimal pressure drop across the first valve assembly 18, which may be less than approximately 0.5 bar(g).

At least one orifice 23 may be disposed in the valve body 38 between the lower valve 24 and the armature 48. As noted above, multiple orifices 23 may be used, or just one as shown, depending on a variety of factors. The factors may include, but are not necessarily limited to, available valve stroke, orifice size, allowable leakage past the lower valve 24, etc. For example, one embodiment may include multiple orifices 23 that are approximately equally spaced, e.g., four orifices 23 positioned 90 degrees apart from each adjacent orifice 23. The orifices 23 may be sized as needed for a particular application, e.g., approximately 0.5 mm to approximately 1 mm in diameter according to another embodiment. In some applications, proper venting may not be achievable using a single orifice 23. Also, leakage past the lower valve 24 may be difficult to predict. Therefore, multiple orifices 23 may be provided, with some of the orifices 23 plugged as needed to tune the first valve assembly 18 for a particular application.

More particularly, the orifice 23 may be formed within the wall 76 of the valve body 38. The rate of fluid flow between the lower chamber 56 and the tank 12 (see FIG. 1) may thus be limited by the orifice 23. In the open position shown in FIG. 6, the orifice 23 may be restricted by spool 62 and may limit a flow of fluid 16, thereby reducing parasitic fluid loss. The orifice 23 also may reduce any appreciable pressure build up due to any fluid leakage occurring past the lower valve 24 in the closed position of FIG. 7.

When the first valve assembly 18 is in the closed position shown in FIG. 7, the orifice 23 may allow for venting of the first valve assembly 18 by dumping fluid 16 that leaks past the spool 62. According to one embodiment, the upper valve seat 46 and the armature 48 may be manufactured to have less than approximately 100 mg/min of fluid leakage or bypass when in the closed position. Fluid leakage past the lower valve 24 in the closed position may be several orders of magnitude higher and may still provide an acceptable pressure unloading function. The orifice 23 may be configured with a diameter (d) that provides optimal pressure unloading. In one embodiment, the diameter (d) of the orifice 23 may be approximately 0.5 mm to approximately 1 mm. However, other diameter sizes may also be used without departing from the intended scope of the invention.

As noted above, the orifice 23 should be large enough to reduce any appreciable pressure buildup due to fluid leakage past the spool 62 in the closed position. The orifice 23 may also be sized small enough to reduce parasitic fluid loss to the tank 12 when the armature 48 and the lower valve 24 are in the open position shown in FIG. 6. The diameter (d) may also be sized to sufficiently minimize any pressure drop across the first valve assembly 18 when in the open position, such as generally shown in FIG. 6.

Referring to FIG. 6, the first valve assembly 18 in the illustrated embodiment may be opened when the solenoid coil 41 is energized, thus allowing the fluid 16 to flow from the supply port 20 to the control port 22. When a magnetic field is generated, the biasing force of the resilient member 50 may be overcome by fluid pressure which may cause the armature 48 to move in the direction of arrow O. As the armature 48 moves in the direction of arrow O, the second end 53 thereof may move away from the extension 57. No longer opposed by the armature 48, the lower valve 24 may be free to move in the direction of arrow O which may permit fluid 16 to flow from the port 20 to the control port 22, and may substantially block the orifice 23. For example, in an embodiment, at least approximately 75% of the orifice 23 may be blocked.

Figure 8:
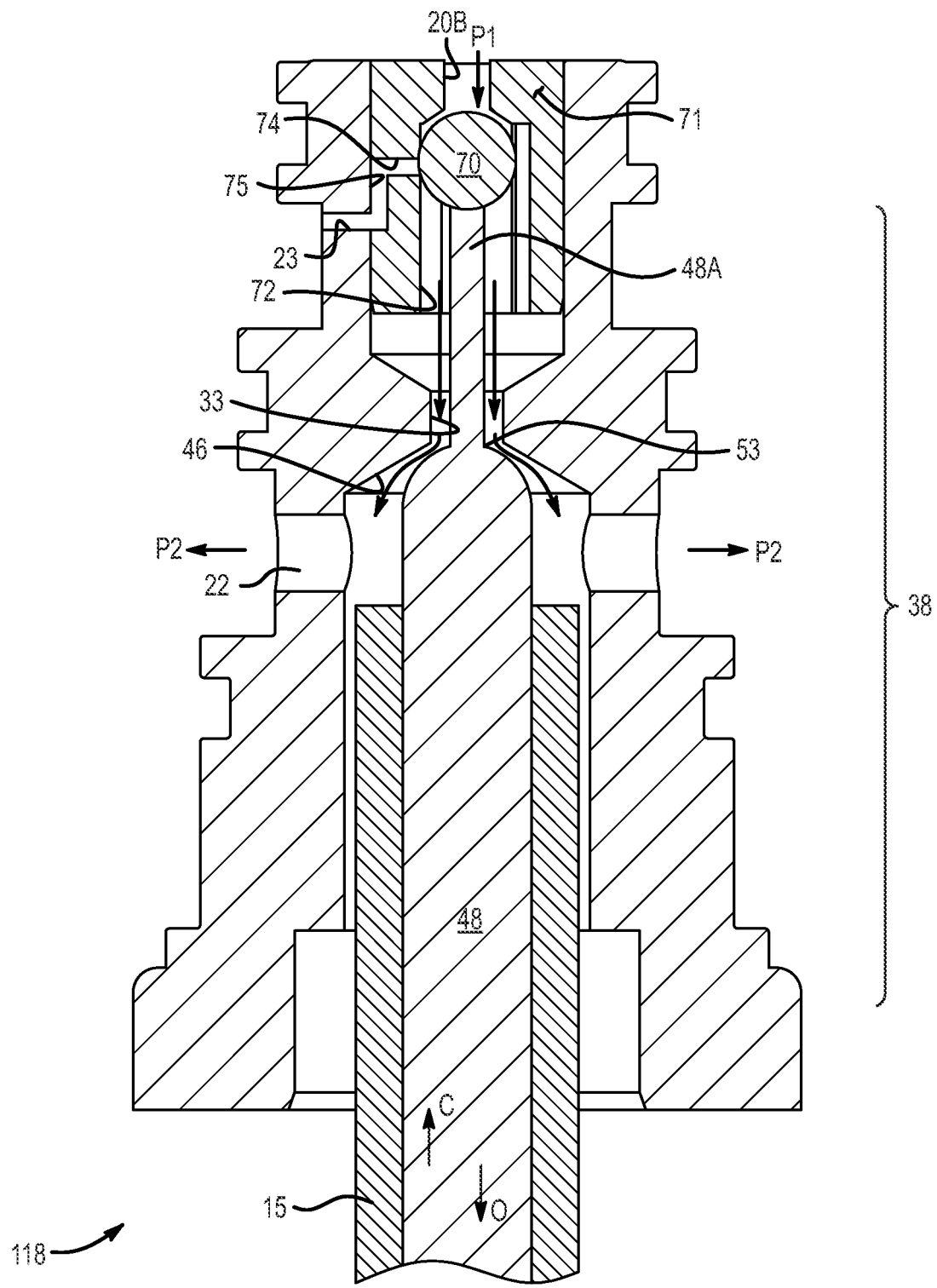
FIG. 8 is a schematic cross-sectional illustration of a valve body portion of the first valve assembly in an opened position in accordance with an embodiment of the invention.
Figure 9:
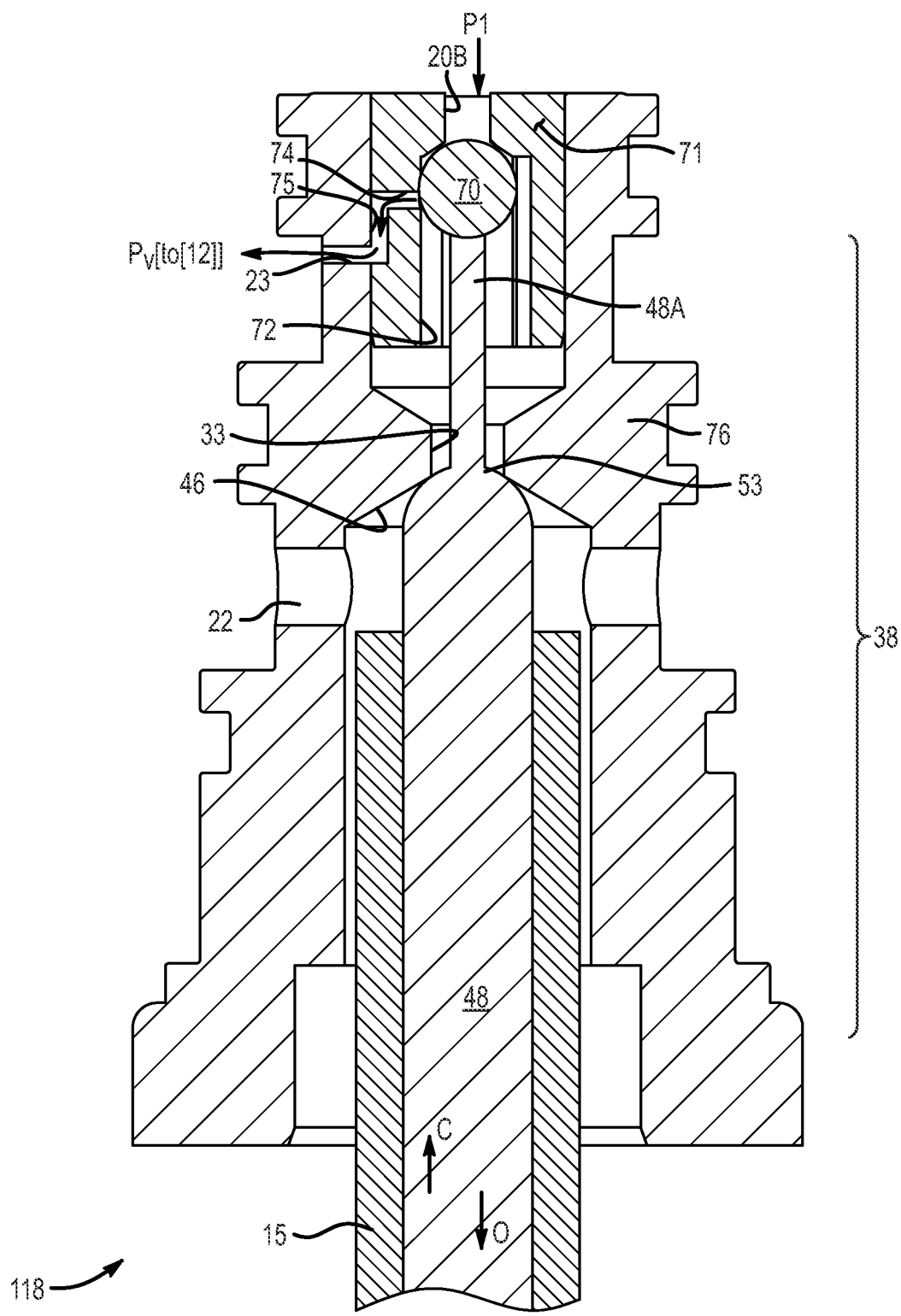
FIG. 9 is a schematic cross-sectional illustration of the valve body portion of the first valve assembly of FIG. 8 in a closed position.

FIGS. 8 and 9 illustrate another first valve assembly 118 where the lower valve 24 may be configured as a ball poppet. For simplicity, the solenoid portion 36, and partial view of the manifold body 4 of FIGS. 6 and 7 are omitted from FIGS. 8 and 9, with the electro-mechanical structure and operation of the solenoid portion 36 described above applying equally to the embodiment of FIGS. 8 and 9. The ball poppet could be used, for example, as a lower-cost device relative to the spool design of FIGS. 6 and 7. However, a ball poppet may be expected to leak at a higher rate relative to the spool design, and therefore a performance vs. efficiency tradeoff may be a consideration in deciding between the particular embodiment to employ in a given fluid circuit.

In the embodiment of FIG. 9, a sphere or ball 70 may be biased towards a closed position by an armature 48, for example via an axial arm or armature pin 48A, which can be coupled to the armature 48 described above. A lower valve seat 71 may be shaped to form a fluid seal with respect to the ball 70 when the armature pin 48A pushes the ball 70 against or near the lower valve seat 71, such as generally shown in FIG. 9.

The lower valve seat 71 may be made of a suitable material to define a plurality of axial grooves 72 and a radial orifice 74. The ungrooved portions of the lower valve seat 71 may contain the ball 70 within an axial path while the grooves 72 may allow fluid 16 to be directed past the ball 70. The radial orifice 74 may be in fluid communication with the orifice 23 via an annular channel 75 formed in and/or between the lower valve seat 71 and the wall 76 of the valve body 38. In this embodiment, fluid pressure (P1) acting on the ball 70 at control port 20B may exceed or overcome the return force of the resilient member 50 (see FIGS. 6 and 7). However, some amount of fluid leakage may be present with respect to the ball 70.

Fluid 16 that bypasses the ball 70 may therefore be directed through the axial grooves 72, the radial orifice 74, and/or the annular channel 75, where it may ultimately be vented to the tank 12 via the orifice 23 to limit pressure acting on the armature 48.

Referring to FIG. 8, when the first valve assembly 118 is energized in a normally-closed configuration, the ball 70 may no longer be biased in the direction of arrow C by the armature pin 48A. Fluid pressure (P1) may then move the ball 70 within the axial grooves 72. The ball 70 may move only so far as to substantially block the radial orifice 74, thus minimizing fluid flow into the orifice 23. In this manner, parasitic losses may be minimized when the first valve assembly 118 is in an energized or open position, for example, as generally shown in FIG. 8.

As will be understood by those of ordinary skill in the art, solenoid-actuated valves such as first valve assemblies 18 and 118 described hereinabove may be configured either as normally open or normally closed devices. A normally-open device may remain in an open position, in the event of a power failure, closing only when energized. A normally closed device may do precisely the opposite, i.e., remaining in a closed position, requiring energizing current to actuate the device. While the first valve assembly 18 and 118 are each described hereinabove as being normally-closed devices, either embodiment may be modified as normally open devices without departing from the intended scope of the invention.

If a second valve assembly 10 is included as part of the dosing manifold assembly 2 in an embodiment of the invention, the second valve assembly 10 may be attached to the manifold body 4. The second valve assembly 10 may be in fluid communication with the detection passage 17 and the return passage 39. Examples of the second valve assembly 10 may include, but are not limited to, a mechanical check valve or an electrohydraulic on/off valve. A mechanical check valve may be cost-effective and not require an energy source to power it because it may be configured to open after a selected pressure has been exceeded. An electrohydraulic on/off valve may be less sensitive to particulates in the fluid 16 and may have the ability to more accurately control pressures of the system. In an embodiment of the invention, the second valve assembly 10 may be used to prevent flow from the detection passage 17 to the return passage 39. The blockage of fluid flow may cause a pressure build up which may be used with the leak detection method described in further detail below. While various examples of the second valve assembly 10 have been explained in detail, other types of the second valve assembly 10 may be utilized as known by those of ordinary skill in the art.

Figure 2:
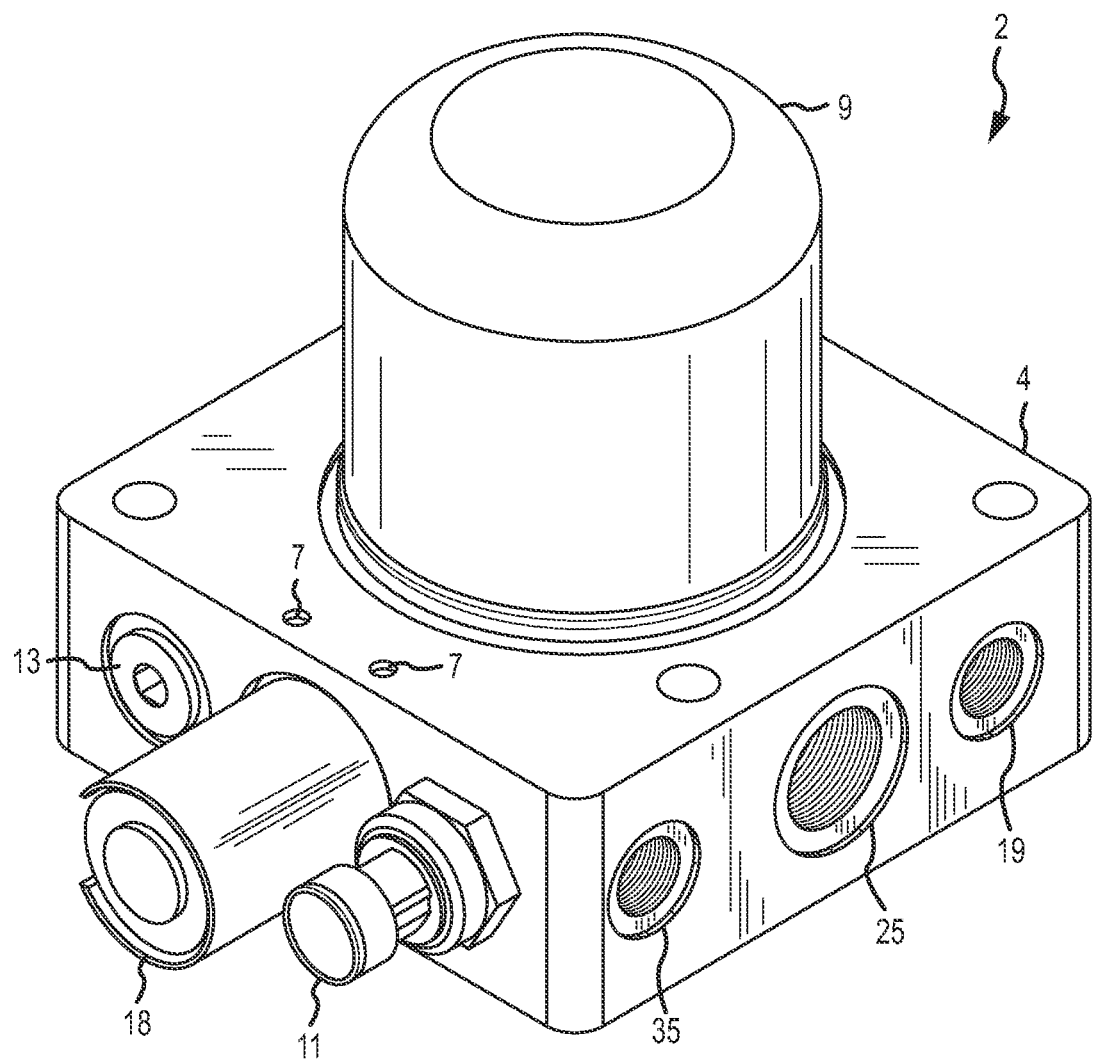
FIG. 2 is a perspective view of the dosing manifold assembly of FIG. 1 in accordance with an embodiment of the invention.
Figure 3:
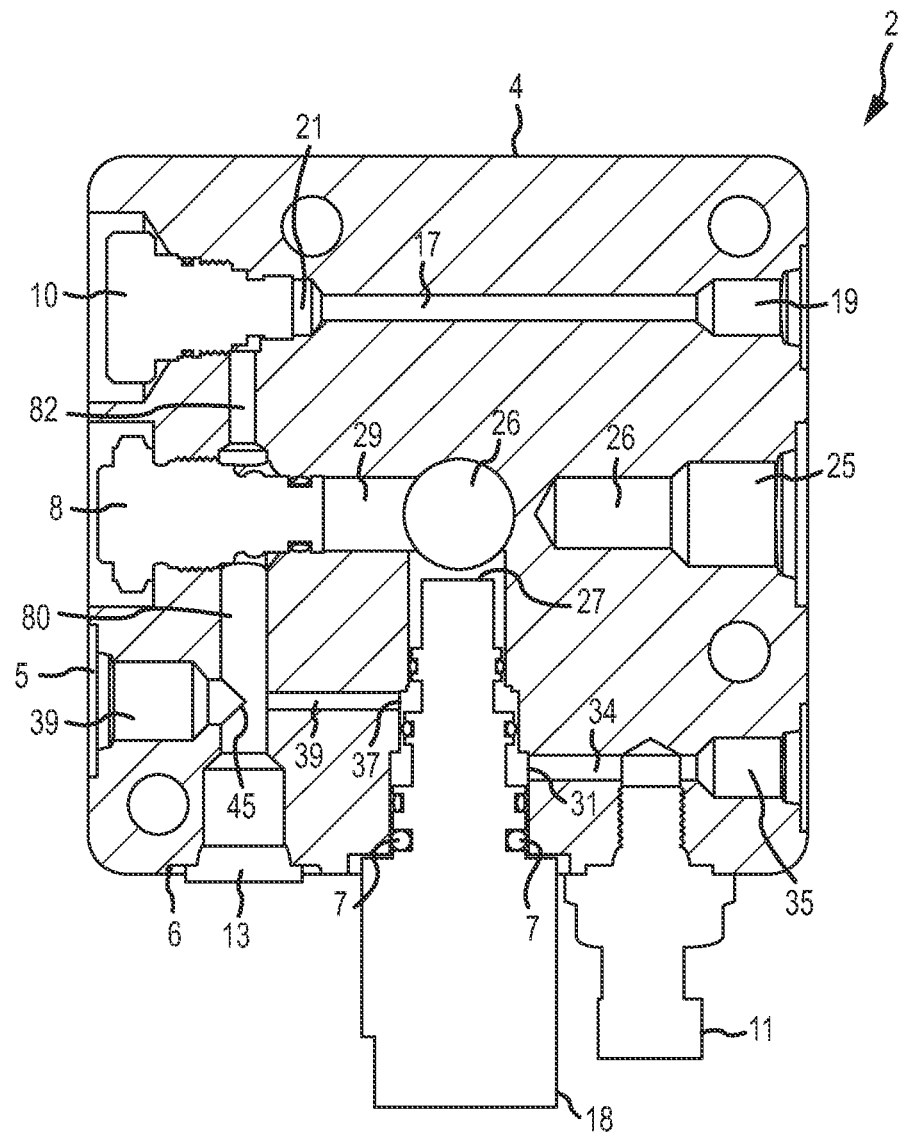
FIG. 3 is a cross-sectional view of the dosing manifold assembly of FIG. 2.
Figure 4:
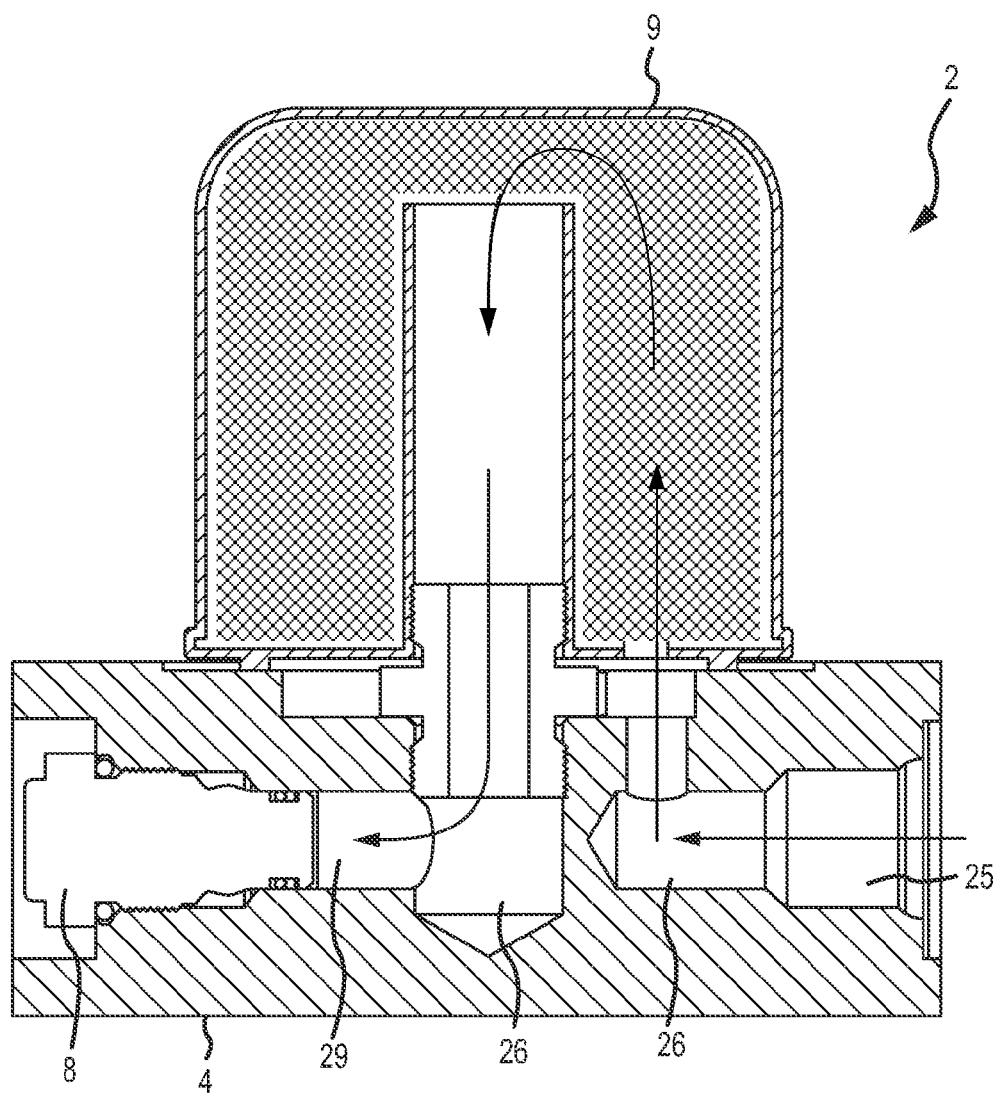
FIG. 4 is a cross-sectional view of the dosing manifold assembly of FIG. 2.
Figure 5:
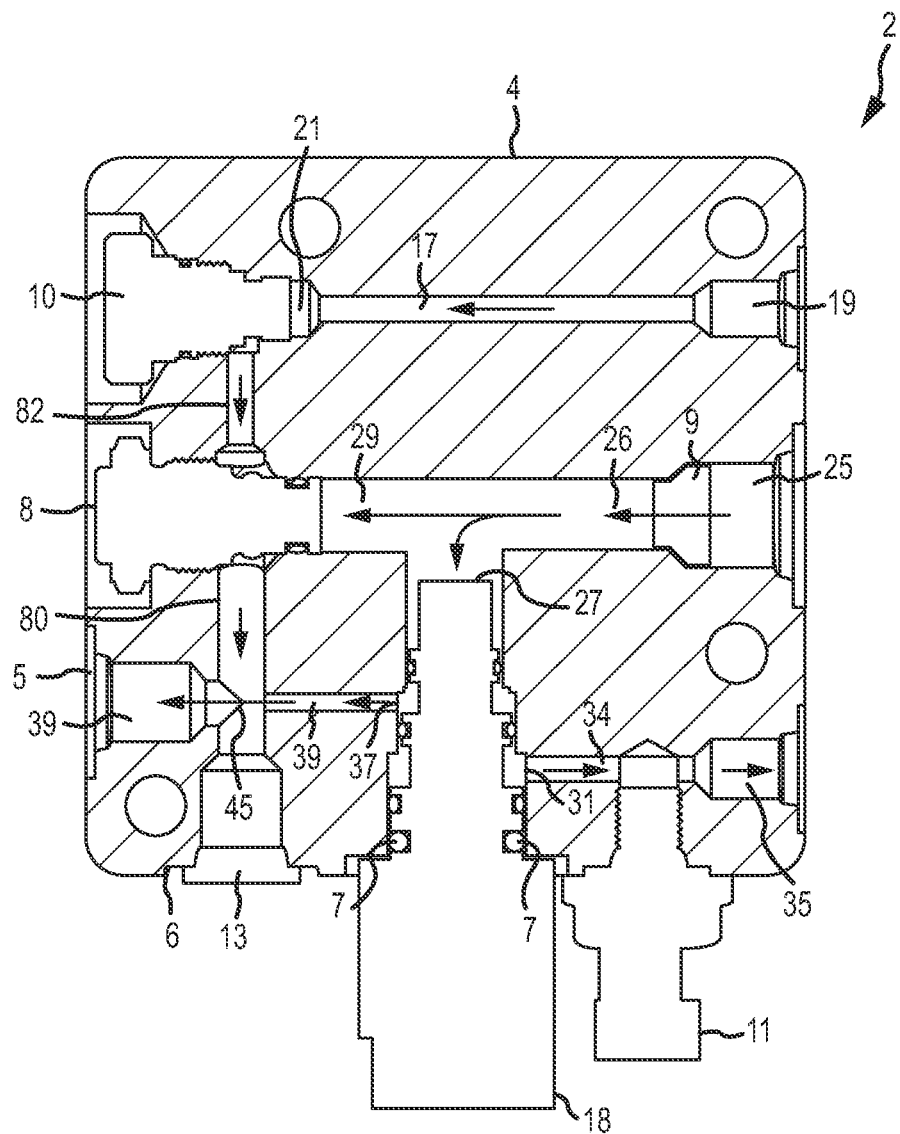
FIG. 5 is a cross-sectional view of the dosing manifold assembly of FIG. 2 including a manifold body, a first valve assembly, a second valve assembly, a pressure relief valve, a sensor, a service plug, and a filter in accordance with an embodiment of the invention.

If a filter 9 is included as part of the dosing manifold assembly 2 in an embodiment of the invention, the filter 9 may be disposed between at least a portion of the supply passage 26 and the first valve assembly 18. As generally illustrated in FIGS. 2 and 4, the filter 9 may be mounted externally on the manifold body 4. The filter 9 may be mounted, for example, by spinning the filter 4 onto the manifold body 4. A hydraulic fitting, such as a union, may be used for attachment purposes. In another embodiment, as generally illustrated in FIG. 5, the filter 9 may be mounted internally in the supply passage 26 of the manifold body 4. The filter 9 may be an in-passage screen or strainer and may be mounted near the inlet end 25 of the supply passage 26. Although various filter types and mounting solutions have been described in detail, other filter types and mounting solutions may be used as known by those of ordinary skill in the art.

If a pressure relief valve 8 is included as part of the dosing manifold assembly 2 in an embodiment of the invention, the pressure relief valve 8 may be attached to the manifold body 4. The pressure relief valve 8 may be in fluid communication with the supply passage 26 and return passage 39. Fluid 16 allowed to pass through the pressure relief valve 8 may flow from the supply passage 26 into the return passage 39. For example, it may be advantageous to use a pressure relief valve 8 to control excess fluid pressure from the pump 14, to smooth inconsistent fluid pressure, or to protect the components connected to the dosing manifold assembly 2 from potentially large fluid pressures. Although these advantages are mentioned in detail, there may be additional advantages associated with the use of a pressure relief valve as known to those of ordinary skill in the art.

If a sensor 11 is included as part of the dosing manifold assembly 2 in an embodiment of the invention, the sensor 11 may be attached to the manifold body 4. The sensor 11 may be in fluid communication with the output passage 34. The sensor 11 may monitor pressure and/or temperature. If the externally connected hydraulic component 32 has a return line, the hydraulic component 32 may be in fluid communication with the detection passage 17 in the manifold body 4. If a second valve assembly 10 is added in an embodiment of the invention, the second valve assembly 10 may be disposed between the detection passage 17 and the return passage 26. Fluid 16 allowed to pass through the second valve assembly 10 may flow from the detection passage 17 to the return passage 26. When the first valve assembly 18 and second valve assembly 10 are in the closed position, the sensor 11 may be used to calculate pressure decay which may determine if any fluid leakage has occurred.

Figure 11:
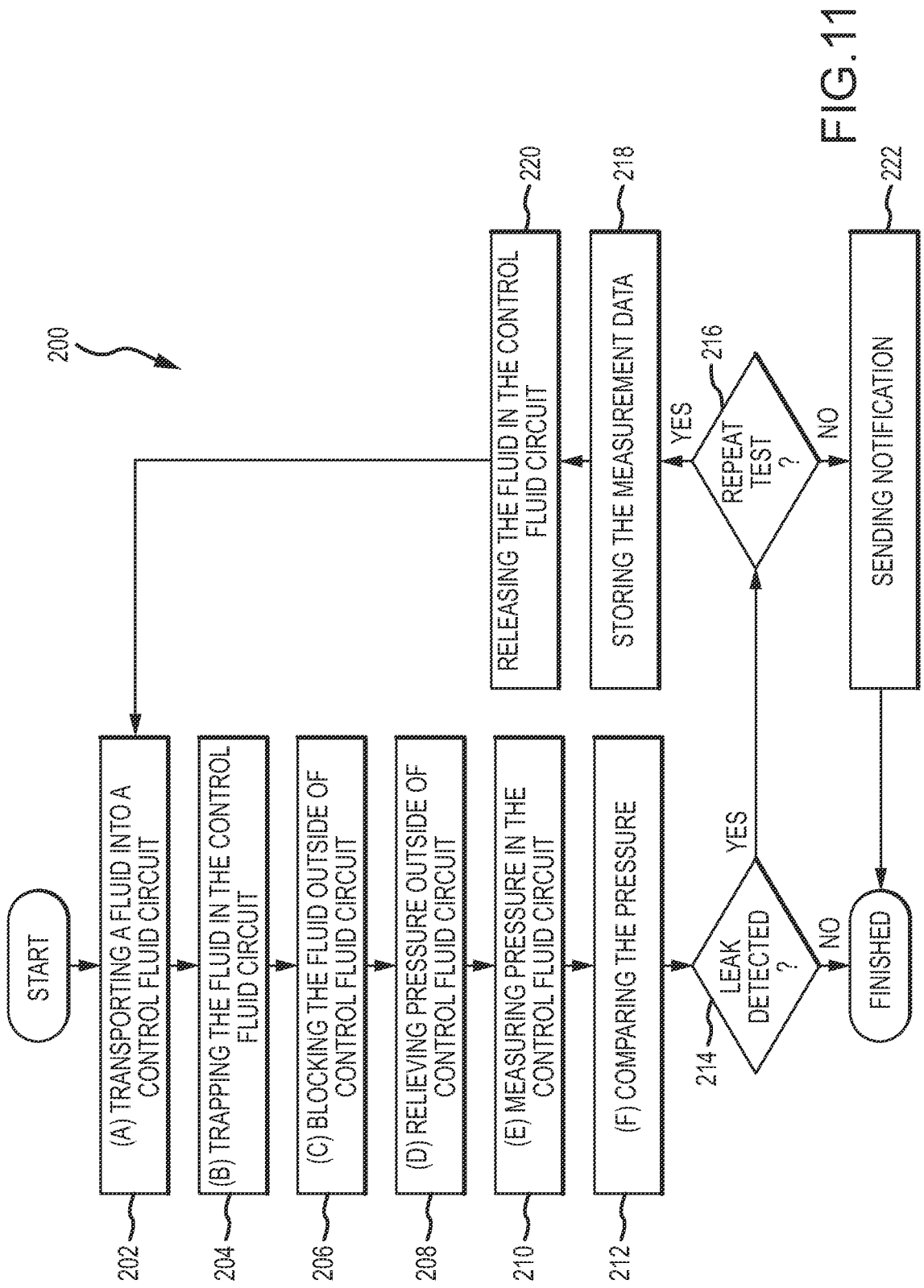
FIG. 11 is a flow chart generally illustrating the steps in a process of detecting a leak in the dosing system of FIG. 1 in accordance with an embodiment of the invention.

Referring to FIG. 11, with component reference to FIG. 1, a leak detection method 200 for use with a dosing manifold assembly 2 may be utilized by trapping fluid 16 under pressure in a closed circuit. A sensor 11 may detect the pressure decay in the closed fluid circuit by measuring the pressures over a set period of time and comparing the measured pressures to a baseline measurement. Additionally, the sensor 11 may also be used to detect temperature variations in the fluid 16 by measuring temperatures over a set period of time and comparing the measured temperatures to a baseline temperature measurement. Variations between the actual measurements versus the baseline measurements may be suggestive of either internal or external leakage. The size of the variation may also be suggestive of the severity of the leak.

FIG. 11 generally illustrates an embodiment of the leak detection method 200. The leak detection method 200 may be utilized when the dosing manifold assembly 2 comprises at least the manifold body 4, the first valve assembly 18, the externally connected hydraulic component 32, and the sensor 11. A control fluid circuit may exist between at least a portion of the first valve assembly 18 and at least a portion of the externally connected hydraulic component 32. The control fluid circuit may include at least a portion of the first valve assembly 18, the output passage 34 of the manifold body 4, any hosing, tubing, conduit, fittings, or other hydraulic equipment used to externally connect the hydraulic component 32 to the dosing manifold assembly 2, and at least a portion of the hydraulic component 32.

Referring to FIG. 11, an embodiment of the leak detection method 200 may begin at step 202 where the fluid 16 may be transported from the supply passage 26 of the manifold body 4, through the first valve assembly 18 connected to the manifold body 4, and into the control fluid circuit. In step 204, one end of the control fluid circuit may be closed by de-energizing the hydraulic component 32 which may prohibit or eliminate any intentional external injection of the fluid 16 outside of the control fluid circuit. Fluid pressure may be formed in the control fluid circuit as a result of the flow blockage. The first valve assembly 18 may then be configured into the closed position. When the first valve assembly 18 is in a closed position, it may create two seals: a first seal and a second seal. The first seal may be formed when the lower valve 24 blocks the supply port 20, which may prevent fluid from entering the first valve assembly. The second seal may be formed by contacting the armature 48 with the upper valve seat 46, which may trap pressurized fluid 16 in the control fluid circuit as well as prevent any fluid leakage past the first seal from entering the control fluid circuit by directing the fluid leakage through the orifice 23.

In another embodiment, the leak detection method 200 may be utilized when the dosing manifold assembly 2 comprises at least the manifold body 4, the first valve assembly 18, the externally connected hydraulic component 32, the sensor 11, and the second valve assembly 10. A control fluid circuit may exist between at least a portion of the first valve assembly 18 and a portion of the second valve assembly 10. The control fluid circuit may include at least a portion of the first valve assembly 18, the output passage 34 of the manifold body 4, any hosing, tubing, conduit, fittings, or other hydraulic equipment used to externally connect the hydraulic component 32 to the dosing manifold assembly 2, the externally connected hydraulic component 32, the detection passage 17 of the manifold body 4, and a portion of the second valve assembly 10.

With regard to an embodiment that includes a second valve assembly 10 as part of the dosing manifold assembly 2, the leak detection method 200 may begin at step 202 where the fluid 16 may be transported from the supply passage 26 of the manifold body 4, through the first valve assembly 18 connected to the manifold body 4, and into the control fluid circuit. In step 204, one end of the control fluid circuit may be closed by configuring the second valve assembly 10 into the closed position. The hydraulic component 32 may also be configured into a closed position by de-energizing the hydraulic component 32 which may prohibit or eliminate intentional external injection of the fluid 16 outside of the control fluid circuit. Fluid pressure may be formed in the control fluid circuit as a result of the flow blockage. The first valve assembly 18 may then be configured into the closed position as described in the embodiment that does not include the second valve assembly 10 as part of the dosing manifold assembly 2, which may result in trapping pressured fluid 16 in the control fluid circuit.

To further increase the accuracy of the leak detection method 200, the first valve assembly 18 may include an integrated fluid bypass, such as the fluid venting function of the orifice 23 in an embodiment of the first valve assembly 18. Without an integrated fluid bypass, when the first valve assembly 18 is in the closed position, fluid pressure in the supply passage 26 may build up and may result in leakage into the closed fluid circuit. This additional leakage may bias the sensor 11 measurements in the closed control fluid circuit, reducing the accuracy of any pressure and temperature sensor measurements. However, in step 206, integrity of the closed control fluid circuit may be maintained by blocking the fluid 16 outside of the control fluid circuit. In step 208, any leakage which may result from fluid pressure build up outside of the control fluid circuit may be relieved by venting fluid 16 through the orifice 23 of the first valve assembly 18 when in the closed position. This may result in reduction of fluid pressure against the second seal which may preserve the integrity of the closed control fluid circuit from becoming compromised.

The resulting trapped fluid pressure in the closed fluid circuit may attempt to escape through internal or external leakage. Any escaping leakage may create a pressure decay which may be characterized by the amount of leakage over a period of time. When no external leakage exists, it may be desirable to characterize the internal leakage as a baseline for future comparisons. It may also be desirable to utilize valve assemblies with low internal leakage because the pressure decay may be fairly linear in slope over a short time interval.

Figure 10:
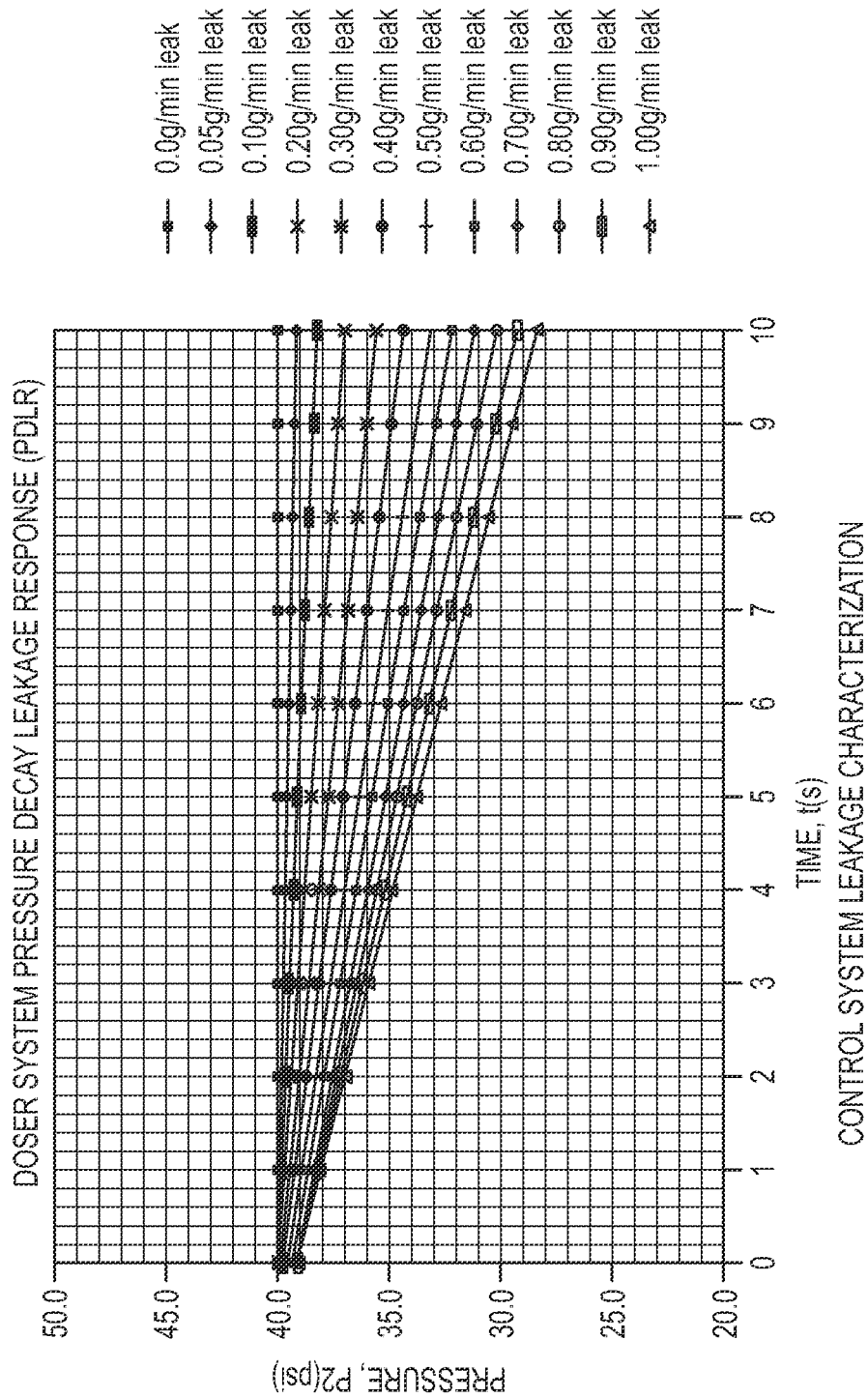
FIG. 10 is a graphical illustration of various pressure decay leakage responses for the dosing system of FIG. 1.

For example, FIG. 10 generally illustrates testing data to characterize the pressure decay of a control fluid circuit of a dosing manifold assembly with various low leakage situations. For the test data shown in FIG. 10, the internal fluid pressure in the circuit was initially set at 40.0 psi. Various internal leakage rates were simulated in the circuit, ranging from 0.00 grams/minute to 1.00 grams/minute. For a ten second period of time, the sensor 11 measured the fluid pressure in the control fluid circuit at one second intervals. As seen in FIG. 10, the pressure measurements compared to time had a pressure decay slope that was substantially linear during the time interval. The slope's linear nature over a short period of time may allow the data to be more accurately characterized when creating curve fit equations. In an embodiment where both the first valve assembly 18 and second valve assembly 10 are rated at a leakage flow rate of less than 1.00 grams/minute when in a closed state, a trapped pressure of 40.0 psi may have a pressure decay of 1.15 psi/sec. FIG. 10 represents one set of data measured at an initial pressure of 40.0 psi. The dosing manifold assembly 2 may handle pressures up to 200 psi and one skilled in the art may obtain and characterize the necessary baseline pressure decay data accordingly for various initial pressures and/or other system parameters. Additional testing may be undertaken to obtain data to characterize the temperature decay of the control fluid circuit of the dosing manifold assembly. One skilled in the art may obtain and characterize the baseline temperature decay data for various system parameters.

In step 210, after the baseline pressure decay due to internal leakage has been quantified, the actual pressure decay of the trapped fluid pressure may be measured by the sensor 11. Additionally, the actual temperature decay of the trapped fluid may measured by the sensor 11. In step 212, the measured actual data may be compared to select characterized data, such as baseline pressure decay data or baseline temperature decay data. For example, the comparison may be performed after measuring one actual data point at a certain period of time. Control logic may be programmed to select the relevant characterized pressure and/or temperature decay curve and then compare the actual data point to the selected characterized data point for the same period of time. The relevant characterized pressure and/or temperature decay curve may be determined based on parameters such as the known system pressure, the known system temperature, the known internal leakage of the system, and time. These known parameters may be initially measured prior to the start of the leak detection method 200 or may be established system characteristics. Additionally, the comparison step 212 may be performed after measuring a plurality of actual data points at known times by repeating step 210 at least once. Measuring and comparing a plurality of actual data points may provide better accuracy for detecting leakage and/or may allow the relevant characterized pressure and/or temperature decay curve to be selected with fewer known system parameters. While various examples have been explained in detail, other ways to measure the actual data and perform the comparison may be utilized as known by those of ordinary skill in the art.

In step 214, the size of the variation between characterized data and the actual data may suggest and may quantify any additional leakage in the circuit. For example, an increase in the variation may suggest an increase in leakage. Depending on the end-user's requirements, the allowable variation may be selected as a tolerance band defined above and below the characterized data. The smaller the tolerance band, the more sensitive the leak detection method 200 may be to variations between the characterized data and the actual data. Likewise, the larger the tolerance band, the less sensitive the leak detection method 200 may be to variations. A leak may be detected when the actual data is outside of the tolerance band of the characterized data. Additionally, multiple tolerance bands may be utilized with a narrow tolerance band for detecting small leaks and a larger tolerance band for detecting larger leaks. One advantage of multiple tolerance bands is that the variation size may trigger different notification events as detailed below in step 222. While various ways for determining whether a leak has be detected have been explained in detail, other ways may be utilized as known by those of ordinary skill in the art.

In step 216, depending on the contamination requirements of the end-user and the resultant configuration of the dosing manifold assembly 2, multiple cycles of the leak detection method 200 may be utilized to confirm variations between characterized data and actual pressure data. In step 218, the measurement data may be stored for later review. In step 220, the cycle may be started by releasing at least a portion of the fluid 16 in the control fluid circuit by configuring the first valve assembly 18 and the device capable of preventing flow into an opened position. For example, in an embodiment where the second valve assembly 10 is a check valve, contamination in the fluid 16 may cause the valve to internally leak at a higher rate if a particulate is lodged on the sealing surface which may prevent an adequate seal. By repeating the cycle, the fluid 16 in the circuit may be pulsed, potentially removing the particulate from the seal and providing a more accurate pressure decay measurement. If desired, more than one cycle may be repeated. Such use of cycling the leak detection method may reduce the potential for false alerts to the end-user.

In step 222, an end-user or other person which may require the results of the leak detection method 200 may be notified of the potential of a leak in the control fluid circuit. Examples of notifying the end-user may range from basic notification such as a warning light to displaying detailed information utilizing the stored measurement data in step 218. Additionally, a controller may be utilized to shut off fluid flow to the control fluid circuit to reduce the impact of the detected leakage. A notification may be sent when a measured pressure value deviates from a select pressure value by a threshold amount. The threshold amount will vary depending on the tolerance band. A notification may also be sent when a measured temperature value deviates from a select temperature value by a threshold amount. The threshold amount will vary depending on the tolerance band. While various notifications and actions have been mentioned in detail, other notifications and actions may be used as known by those of ordinary skill in the art.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. A dosing manifold assembly comprising:
   a manifold body comprising a supply passage, an output passage, and a return passage;
   a first valve assembly connected to the manifold body, the first valve assembly comprising:
   a valve body including:
      a supply port in fluid communication with the supply passage;
      a first chamber;
      a second chamber in fluid communication with the first chamber;
      a first valve seat, and;
      a control port in fluid communication with the output passage;
   an armature positioned at least partially in the first chamber, wherein the armature is configured to seal against the first valve seat when the first valve assembly is closed, and to move away from the first valve seat to allow fluid to pass through the control port and to the output passage when the first valve assembly is open; and
   a valve device positioned in the second chamber, and having a moveable portion positioned adjacent to the supply port to selectively admit fluid into the second chamber and past the first valve seat when the first valve assembly is open;
   wherein the valve body further defines at least one orifice between the supply port and the first valve seat, the orifice being in fluid communication with the return passage and configured for venting fluid that leaks past the valve device to the return passage when the first valve assembly is closed;
   the first valve assembly further comprises:
   a magnetic sleeve disposed within the valve body, wherein the armature is adapted to move in conjunction with the magnetic sleeve and positioned substantially within the first chamber;
   a solenoid coil that can be energized to generate a magnetic field sufficient for moving the magnetic sleeve and armature into one of an open and a closed position; and
   a resilient member that biases the armature against the first valve seat when the first valve assembly is closed;
   wherein the output passage is configured to output fluid from the first valve assembly to a hydraulic component external to the manifold body; and
   the manifold body further comprises a detection passage configured to receive fluid from the hydraulic component external to the manifold body.

2. The dosing manifold assembly as recited in claim 1, wherein the detection passage is configured to receive fluid from the hydraulic component.

3. A dosing manifold assembly comprising:
   a manifold body comprising a supply passage, an output passage, and a return passage;
   a first valve assembly connected to the manifold body, the first valve assembly comprising:
   a valve body including:
      a supply port in fluid communication with the supply passage;
      a first chamber;
      a second chamber in fluid communication with the first chamber;
      a first valve seat, and;
      a control port in fluid communication with the output passage;
   an armature positioned at least partially in the first chamber, wherein the armature is configured to seal against the first valve seat when the first valve assembly is closed, and to move away from the first valve seat to allow fluid to pass through the control port and to the output passage when the first valve assembly is open; and
   a valve device positioned in the second chamber, and having a moveable portion positioned adjacent to the supply port to selectively admit fluid into the second chamber and past the first valve seat when the first valve assembly is open;
   wherein the valve body further defines at least one orifice between the supply port and the first valve seat, the orifice being in fluid communication with the return passage and configured for venting fluid that leaks past the valve device to the return passage when the first valve assembly is closed;
   the first valve assembly further comprises:
   a magnetic sleeve disposed within the valve body, wherein the armature is adapted to move in conjunction with the magnetic sleeve and positioned substantially within the first chamber;
   a solenoid coil that can be energized to generate a magnetic field sufficient for moving the magnetic sleeve and armature into one of an open and a closed position; and
   a resilient member that biases the armature against the first valve seat when the first valve assembly is closed;
   wherein the output passage is configured to output fluid from the first valve assembly to a hydraulic component external to the manifold body; and
   the hydraulic component comprises an aftertreatment dosing injector.

4. The dosing manifold assembly as recited in claim 2, further comprising a second valve assembly connected to the manifold body, wherein the second valve assembly is in fluid communication with the detection passage and the return passage.

5. The dosing manifold assembly as recited in claim 4, wherein the second valve assembly is a check valve and allows less than about 0.1 g/min of fluid leakage.

6. The dosing manifold assembly as recited in claim 4, wherein the second valve assembly is a on/off valve and allows less than about 0.1 g/min of fluid leakage.

7. The dosing manifold assembly as recited in claim 4, further comprising a manifold body wherein the return passage has a first port opening and a second port opening.

8. The dosing manifold assembly as recited in claim 7, wherein the second port opening is sealed with a service plug.

9. A dosing manifold assembly comprising:
a manifold body comprising a supply passage, an output passage, and a return passage;
a first valve assembly connected to the manifold body, the first valve assembly comprising:
a valve body including:
a supply port in fluid communication with the supply passage;
a first chamber;
a second chamber in fluid communication with the first chamber;
a first valve seat, and;
a control port in fluid communication with the output passage;
an armature positioned at least partially in the first chamber, wherein the armature is configured to seal against the first valve seat when the first valve assembly is closed, and to move away from the first valve seat to allow fluid to pass through the control port and to the output passage when the first valve assembly is open; and
a valve device positioned in the second chamber, and having a moveable portion positioned adjacent to the supply port to selectively admit fluid into the second chamber and past the first valve seat when the first valve assembly is open;
wherein the valve body further defines at least one orifice between the supply port and the first valve seat, the orifice being in fluid communication with the return passage and configured for venting fluid that leaks past the valve device to the return passage when the first valve assembly is closed;
the first valve assembly further comprises:
a magnetic sleeve disposed within the valve body, wherein the armature is adapted to move in conjunction with the magnetic sleeve and positioned substantially within the first chamber;
a solenoid coil that can be energized to generate a magnetic field sufficient for moving the magnetic sleeve and armature into one of an open and a closed position; and
a resilient member that biases the armature against the first valve seat when the first valve assembly is closed;

wherein the output passage is configured to output fluid from the first valve assembly to a hydraulic component external to the manifold body; and
further comprising a filter disposed between at least a portion of the supply passage and the first valve assembly;
wherein the filter is externally mounted to the manifold body.

10. A dosing manifold assembly comprising:
a manifold body including a supply passage, an output passage, a detection passage, and a return passage;
a first valve assembly including:
a valve body including:
a supply port in fluid communication with the supply passage;
a first chamber;
a second chamber in fluid communication with the first chamber;
a first valve seat, and;
a control port in fluid communication with the output passage;
an armature positioned at least partially in the first chamber, wherein the armature is configured to seal against the first valve seat when the first valve assembly is closed, and to move away from the first valve seat to allow fluid to pass through the control port and to the output passage when the first valve assembly is open wherein the outlet passage is in fluid communication with a hydraulic component external to the manifold body; and
a valve device positioned in the second chamber, and having a moveable portion positioned adjacent to the supply port to selectively admit fluid into the second chamber and past the first valve seat when the first valve assembly is open; and
wherein the valve body further defines at least one orifice between the supply port and the first valve seat, the orifice being in fluid communication with the return passage, and configured for venting fluid that leaks past the valve device to the return passage when the first valve assembly is closed wherein the return passage is in fluid communication with a tank external to the manifold body; and
a filter connected to the manifold body disposed between at least a portion of the supply passage and the first valve assembly.

11. The dosing manifold assembly as recited in claim 10, further comprising:
a second valve assembly connected to the manifold body, wherein:
the second valve assembly is in fluid communication with the detection passage and the return passage;
the detection passage is in fluid communication with the hydraulic component external to the manifold body; and
the hydraulic component external to the manifold body is in fluid communication with both the first valve assembly and the second valve assembly.

* * * * *